March 1, 1960  B. B. OSHER  2,926,714
WING ASSEMBLY FOR BILLFOLDS, WALLETS, PASS CASES AND THE LIKE
Filed April 18, 1957
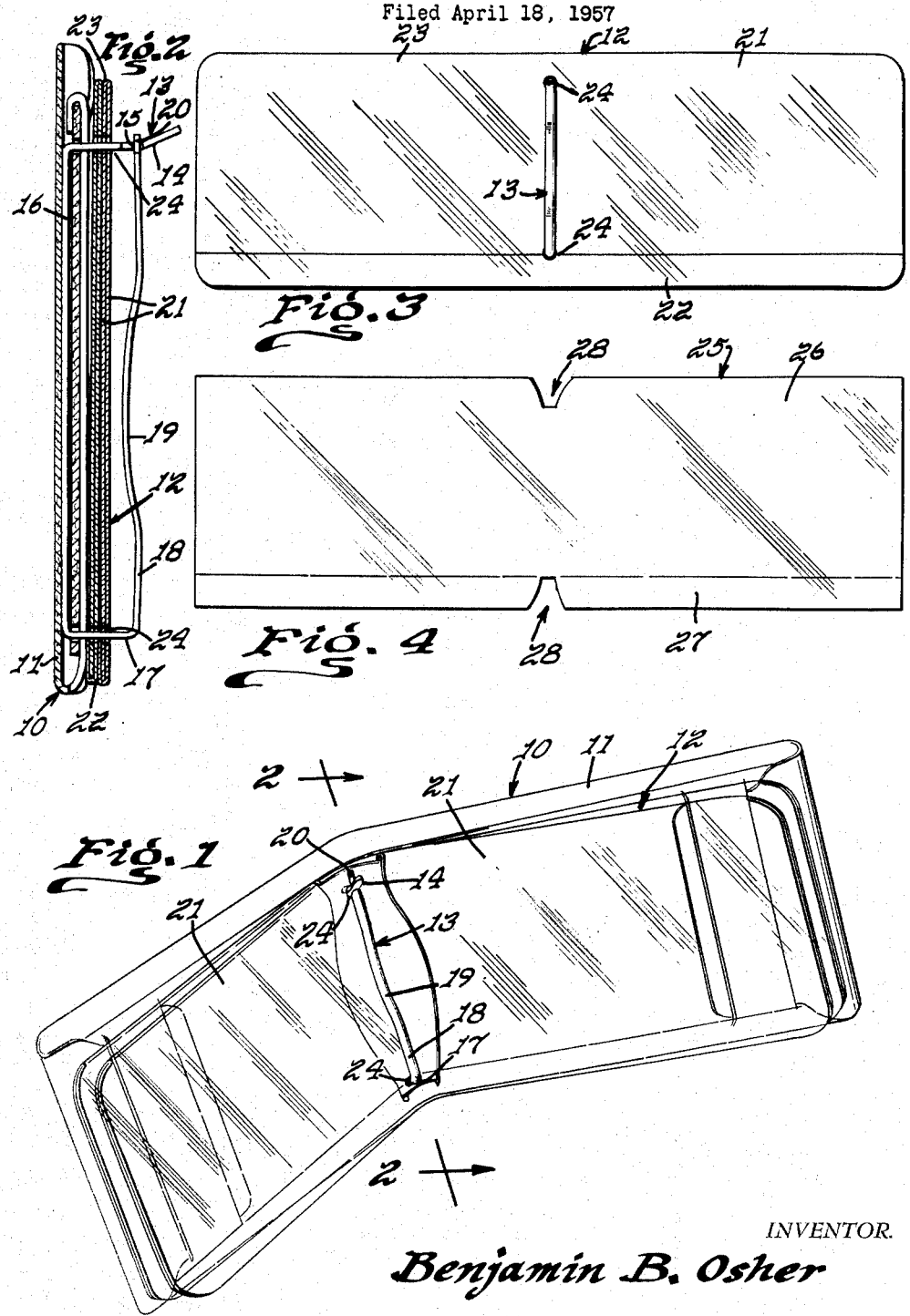
INVENTOR.
Benjamin B. Osher
BY
Sherman Levy  ATTORNEY

United States Patent Office 2,926,714
Patented Mar. 1, 1960

2,926,714

WING ASSEMBLY FOR BILLFOLDS, WALLETS, PASS CASES AND THE LIKE

Benjamin B. Osher, Lawrence, N.Y., assignor to American Kleer-Vu Plastics, Inc., New York, N.Y., a corporation of New York Application April 18, 1957, Serial No. 653,590

2 Claims. (Cl. 150—39)

This invention relates to a billfold, wallet, pass case or the like, and more particularly to a wing assembly for such a billfold, wallet, or pass case.

The object of the invention is to provide a wing assembly for a pass case or the like wherein the wing assembly is adapted to be made of a single piece of material such as a transparent plastic.

Another object of the invention is to provide a wing assembly for a billfold, pass case, wallet or the like, wherein the wing assembly is an improvement over existing or prior wing assemblies in that the wing assembly is made from a single piece of transparent material instead of being made out of a plurality of different parts or sections.

A still further object of the invention is to provide a one-piece wing assembly for pass cases or the like, wherein the wing assembly is provided with means for engagement with a clamping bar so that the wing assemblies can be maintained in their proper positions in the pass case, and wherein the means may include openings or cutouts formed in the wing assembly.

A further object of the invention is to provide a one-piece wing assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing a pass case equipped with the wing assemblies of the present invention.

Figure 2 is a sectional view taken on the line 2—2 of Figure 1.

Figure 3 is an elevational view showing one of the wing assemblies with a clamping bar connected thereto.

Figure 4 is a view illustrating a modified wing assembly.

Referring in detail to the drawings, the numeral 10 designates a wallet, billfold, pass case or the like, which includes a backing member 11, and connected to the backing member 11 is one or more wing assemblies 12. The wing assemblies 12 are adapted to be made of a single piece of plastic material as later described in this application.

A means is provided for connecting the wing assemblies 12 to the backing member 11, and this means comprises a bracket or clamping bar which is indicated generally by the numeral 13. The clamping bar 13 includes a first portion 14 which is provided with an opening 15 intermediate its ends, and arranged at right angles with respect to the first postion 14 is a second portion 16, Figure 2. Arranged at right angles with respect to the second portion 16 is a third portion 17, and extending at right angles from the third portion 17 is a fourth portion 18. The fourth portion 18 is provided with an intermediate off section 19, and an end 20 of the portion 18 is adapted to extend through the opening 15 of the first portion 14 so as to maintain the parts in their proper assembled relation.

The one-piece wing assembly 12 includes a pair of superposed wall members 21 which are integrally joined at one longitudinal side edge 23, and extending from the opposite side edge of one of the wall members 21 is a flap 22 which overlies the adjacent portion of the other wall member as shown in Figure 2 for example. There is further provided in the wing assembly 12 a means for engagement with the bar 13, and this means comprises in Figure 3 a pair of spaced apart openings 24 through which extend the portions 14 and 17 of the bar 13. The openings 24 are spaced inwardly from the side edges of the walls 21, and these openings 24 are arranged intermediate the ends of the walls.

Referring to Figure 4 of the drawings, there is shown a modified one-piece wing assembly which is indicated generally by the numeral 25, and the wing assembly 25 is again adapted to be made of a single piece of suitable material such as a single piece of an acetate type of plastic which is transparent. The wing assembly 25 includes a pair of superposed walls 26 which are integrally joined at one side edge thereof, while extending from the opposite side edge of one of the wall members 26 is a flap 27 which overlaps or overlies the adjacent edge portion of the other wall member 26. The wing assembly 25 is formed with or provided with a modified means for engagement with the clamping bar 13 and this modified means includes a pair of opposed cutouts which are each indicated generally by the numeral 28. The cutouts 28 extend inwardly from the side edges of the walls, and the cutouts 28 are arranged intermediate the ends of the walls. Cutout 28 has a flaring shape so that the outer portion thereof is wider or of greater size than the inner portion thereof, and these cutouts 28 are adapted to have project therethrough the portions 14 and 17 of the clamping bar 13.

From the foregoing, it is apparent that there has been provided a wing assembly for use with billfolds, pass cases, wallets or the like, wherein the wing assemblies are adapted to be made of a single piece of suitable material such as transparent plastic. In Figures 1, 2 and 3, it will be seen that the wing assemblies 12 are adapted to be connected to the backing member 11 by means of the clamping bar 13, and the clamping bar 13 includes the spaced apart portions 14 and 17 which extend through the openings 24 in the wing assembly 12. The openings 24 are spaced inwardly from the side edges of the wing assembly, and these openings are also arranged intermediate the ends of the wing assembly. The pair of walls 21 are adapted to receive therebetween cards, photographs, or the like, and these walls 21 can be readily flexed outwardly a sufficient distance to permit such cards or the like to be inserted therebetween. The portion 20 of the clamping bar 13 extends through the opening 15 so as to maintain the parts in their proper assembled relation, and by disengaging the portion 20 from the opening 15, the wing assemblies 12 can be readily removed or replaced on the clamping bar.

Referring to Figure 4 of the drawings, there is shown the modified wing assembly 25 which is also made of a single piece of suitable plastic such as an acetate type of plastic, and the wing assembly 25 is provided with a pair of cutouts 28 instead of the openings 24. The cutouts 28 are adapted to have projecting therethrough the portions 14 and 17 of a clamping bar 13. The walls 26 are adapted to receive therebetween cards, photographs or the like, and it will be seen that the cutouts 28 have a flaring shape so that the outer portion thereof is larger than the inner portion thereof whereby the wing assemblies 25 will be firmly locked or retained on the clamping bar 13. The flap such as the flap 27 serves to maintain the walls 26 in their proper contiguous relationship so that cards or the like will not accidentally drop out of the wing assemblies.

Heretofore wing assemblies have been made from a plurality of different sections so that the cost and job of fabricating such wing assemblies was expensive and difficult to perform. By making the wing assembly of a single piece of plastic, the wing assembly can be easily fabricated or formed, and the cost of the device is quite low.

As a specific example of the type of material that can be used for forming the wing assembly, it is to be noted that a Mylar type of plastic such as that made by the Dupont Company can be used, and by making the wing assembly of a single piece of material, it is not necessary to use any connecting material in the center of two envelopes as has been done heretofore. However, the present invention is not restricted to any specific material. The wing assemblies can also be attached in place by other means such as being sewed into a wallet, pass case or the like.

I claim:
1. In a wing assembly for billfolds, wallets, pass cases and the like which include a clamping bar, said wing assembly being fabricated of and consisting solely of a single piece of transparent plastic material which comprises a pair of superposed walls which are integrally joined at one side edge thereof, a flap extending from a longitudinal side edge of one of said walls and overlapping the adjacent side edge portion of the other wall, said flap serving to maintain the walls in their proper contiguous relationship so that cards or the like will not accidentally drop out of the wing assembly, there being a pair of cutouts arranged intermediate the ends of said walls and extending inwardly from the side edges of said walls, said cutouts adapted to have projecting therethrough portions of the clamping bar, said pair of cutouts being arranged in opposed relation with respect to each other, one of the cutouts extending through the flap as well as through both walls, said wing assembly being foldable along a line extending through said cutouts.

2. A wing assembly as recited in claim 1 wherein each cutout has a flaring shape so that the outer portion thereof is of greater size than the inner portion thereof.

References Cited in the file of this patent
UNITED STATES PATENTS

| | | |
|---|---|---|
| 951,814 | Hay | Mar. 15, 1910 |
| 2,694,429 | Berger | Nov. 16, 1954 |
| 2,750,642 | England | June 19, 1956 |
| 2,797,461 | Osher | July 2, 1957 |
| 2,828,790 | Osher | Apr. 1, 1958 |